Mar. 27, 1923.

G. H. HINES.
ADJUSTABLE AUTOMATIC BOLT.
FILED JULY 28, 1921.

1,449,997.

G. H. Hines, INVENTOR.

BY Geo. P. Kimmel, ATTORNEY.

Patented Mar. 27, 1923.

1,449,997

UNITED STATES PATENT OFFICE.

GUSTAVE H. HINES, OF CHICAGO, ILLINOIS, ASSIGNOR TO THE V. & S. AUTOMATIC BOLT COMPANY, A CORPORATION OF ILLINOIS.

ADJUSTABLE AUTOMATIC BOLT.

Application filed July 28, 1921. Serial No. 488,183.

*To all whom it may concern:*

Be it known that I, GUSTAVE H. HINES, a citizen of the United States, residing at Chicago, in the county of Cook and State of Illinois, have invented certain new and useful Improvements in Adjustable Automatic Bolts, of which the following is a specification:

This invention relates to self adjusting automatic bolts and more particularly to bolts for connecting two members of a bearing.

The object of the invention is to provide a bolt of this character constructed to automatically take up the bearings to compensate for wear and to promote and secure an even bearing at all times for the members.

Another object is to provide a device of this character so constructed as to prevent any binding against the lower part of the bearing which it connects and which is equipped with a coiled spring so shaped that it will retain its shape when wound to pressure and which will have a working pressure of from thirty to forty pounds at all times.

With these and other objects in view, the invention consists in certain novel features of construction as hereinafter shown, described and claimed.

Figure 1:
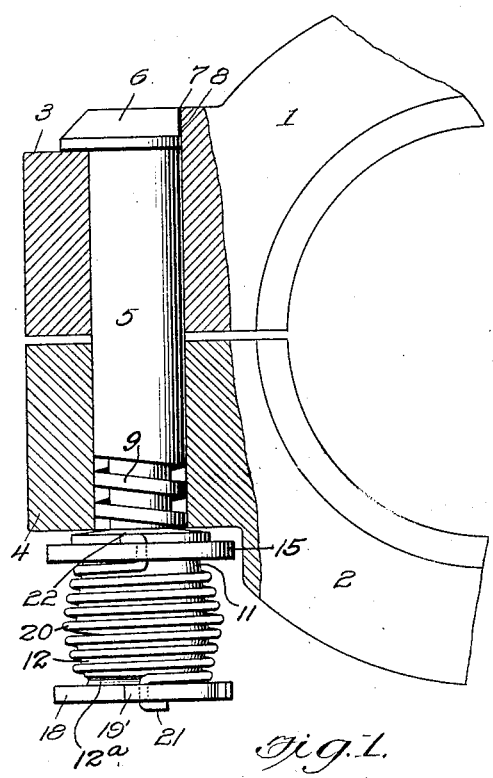
Figure 1 represents a side elevation partly in section of a bearing with this improved bolt shown applied.

In the embodiment illustrated the members 1 and 2 of a bearing are shown, having at their meeting ends, laterally spaced, outwardly projecting, apertured ears 3 and 4 to receive the bolt 5 which constitutes this invention. The ears 3 and 4 are provided with flat inner faces spaced apart to permit a take up as may be readily understood.

The bolt 5 which is used for connecting the members 1 and 2 by passing it through the apertures in the ears 3 and 4 thereof, has a head 6, one side of which is cut away flat, as shown at 7, to abut a cooperating shoulder 8 carried by the member 1 to prevent the bolt from turning in the ears 3 and 4.

This bolt 5 is provided at its other end with a coarse left hand thread 9 and in advance thereof with a finer right hand thread 10, on which are designed to be mounted cooperating nuts 11 and 12, the meeting faces 13 of which are beveled oppositely at a pitch of about five degrees to prevent binding of the nuts on their meeting faces. The upper end of the cap or nut 11 is also beveled at a pitch of about two degrees, as shown at 14, to prevent it from binding against the lower part of the bearing carried ear 4. The member 11 is provided at its upper end, below the beveled portion 14 thereof with a laterally extending flange 15, which is equipped in its periphery with an opening 16, having a circumferentially extending finger 17, said opening being designed to receive one end of a coiled spring 20, presently to be described.

Figure 2:
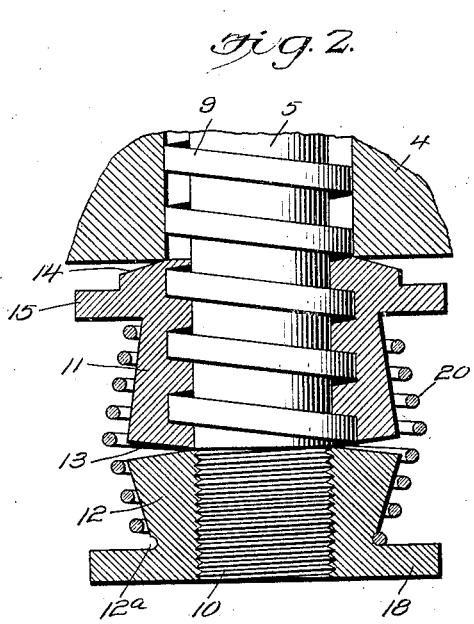
Fig. 2 is an enlarged detail sectional view of the nut carried end of the bolt.
Figure 3:
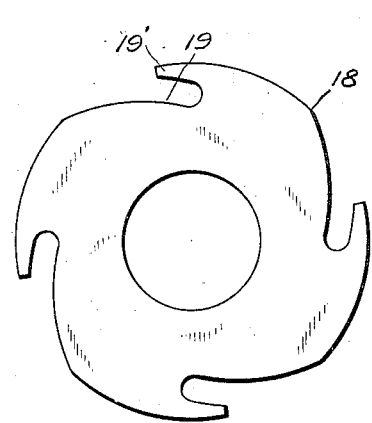
Fig. 3 is a plan view of one of the locking nuts used in connection with the bolt.

The outer face of the cap 11 flares toward the beveled end 13 thereof and the outer face of the member 12 is similarly flared so that when these members are assembled, as shown in Fig. 2, they will present a barrel-like structure to receive the correspondingly shaped coiled spring 20.

The member 12 is provided at its outer end with an annular ratchet flange 18, having tangentially arranged slot-like openings 19 in its perimeter to receive the other end of the coiled spring 20, said openings having overhanging hook-like lips 19′ to retain the end of the spring engaged therewith. It is of course understood, that any desired number of these openings 19 may be provided, four being here shown.

Figure 4:
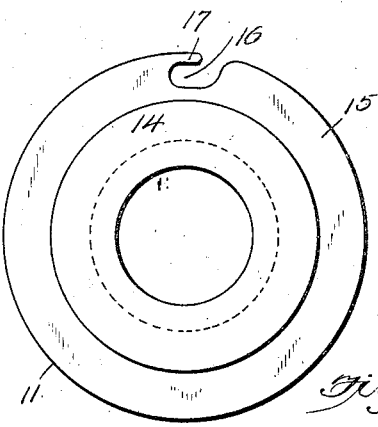
Fig. 4 is a similiar view of the other nut.

The member 12 has a groove 12$^a$ at the inner face of the flange 18 at its junction with the body of said member, as is shown clearly in Fig. 2, and which is designed to receive the outer coil of the spring 20, the terminal of which is bent into hook-like form 21 for engagement with one of the apertures or slots 19 of the flange 18 of the member 12. The other end of said spring has a similar hook 22 for engagement with the opening 16 in the flange 15 of the member 11, said hook 22 being secured in said opening by bending down the free end or the point of the finger 17, which is shown clearly in Fig. 4.

It is to be understood that the bolt 5 is to be constructed of high grade machine steel with a smooth finish all around.

The barrel shaped coiled spring 20 is preferably constructed of #35 German music wire and the coils arranged in close proximity, with their ends bent as above described at 21 and 22 for attachment to the upper cap 11 and the ratchet cap 12.

The spring 20 may be tightened up so that it may have at least forty pounds pressure, more or less, or until the bearing members 1 and 2 are tightened to the desired extent. The nut 11 is initially set up against the portion 4 of the bearing in the usual manner to hold the main bearing portions 1 and 2 with the required pressure on the shaft journal or the other member engaged thereby. The spring 20 is then disposed over the nut 11 and the hooked terminal 22 engaged with the recess 16 of the flange 15. The nut 12 is then applied to the finer right hand threads 10 and the spring manually rotated around the main nut 11 a sufficient number of turns to produce the requisite tension thereto and the hooked terminal 21 engaged with one of the recesses 19 of the flange 16. The nuts 11 and 12 being engaged respectively with the right and left handed threads, the nuts can be revolved only in opposite directions, consequently the spring 20 will apply a constant strain upon the nut 12 and in event of wear between the members 1 and 2, will automatically rotate the nut 11 upon its threads 9 and "take up" the wear, and thus automatically maintain the bearing members in operatively close relation.

The preferred embodiment of the invention is disclosed in the drawings and set forth in the specification, but it will be understood that any modifications within the scope of the claimed invention may be made in the construction without departing from the principle of the invention or sacrificing any of its advantages.

What I claim is:

1. A bolt having right and left handed threads, a bearing nut engaging one of said threads and adapted to bear against the body through which the bolt operates, a holding nut engaging the other of said threads, and a spring engaging around said nuts and coupled at its ends respectively thereto, whereby a constant rotative strain is exerted in opposite directions on the nuts.

2. A bolt having right and left handed threads, a bearing nut engaging one of said threads and having bevelled faces and adapted to bear by one of said bevelled faces against the body through which the bolt operates, a holding nut engaging the other of said threads and against the other bevelled face of said bearing nut, and a spring engaging around said nuts and coupled at its ends respectively thereto, whereby a constant rotative strain in opposite directions is exerted on the nuts.

In testimony whereof, I affix my signature hereto.

GUSTAVE H. HINES.